(12) United States Patent
Wilds et al.

(10) Patent No.: US 8,988,672 B2
(45) Date of Patent: Mar. 24, 2015

(54) HEADLAMP AIMING USING HIGH-DYNAMIC RANGE CAMERA

(75) Inventors: John Wesley Wilds, Trenton, MI (US); Michael Wegrzyn, Canton, MI (US); Stephanie Askew, Livonia, MI (US); Albert Ekladyous, Shelby Township, MI (US); Arun Kumar, Farmington Hills, MI (US); Diane Marie LaHaie, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 439 days.

(21) Appl. No.: 13/548,228

(22) Filed: Jul. 13, 2012

(65) Prior Publication Data

US 2014/0015962 A1 Jan. 16, 2014

(51) Int. Cl.
*G01J 1/00* (2006.01)
*G01M 11/06* (2006.01)
*G06K 9/00* (2006.01)

(52) U.S. Cl.
CPC . *G01M 11/06* (2013.01); *G06K 9/00* (2013.01)
USPC .............................. 356/121; 701/1; 356/122

(58) Field of Classification Search
CPC .................................... G06K 9/00; B60Q 1/00
USPC ............... 356/121–127; 701/1, 28, 36, 45, 49
See application file for complete search history.

(56) References Cited

U.S. PATENT DOCUMENTS 8,422,004 B1 * 4/2013 Ekladyous et al. ........... 356/121
2014/0015962 A1 * 1/2014 Wilds et al. .................. 348/135

* cited by examiner

*Primary Examiner* — Bhavesh V Amin
(74) *Attorney, Agent, or Firm* — Joseph E. Root

(57) ABSTRACT

A method of aiming a light source includes using an image-capturing device to capture a light beam pattern from the light source. Here, the light beam pattern is configured to include a plurality of contrast ratios transitioning from a first intensity region to a second intensity region. The method includes processing the contrast ratios of the light beam pattern to obtain corresponding values of the contrast ratios, transitioning from the first intensity region to the second intensity region, where the corresponding values are logarithmic values, which in turn generate a related response curve. Finally, the method provides for using the logarithmic values and the response curve to aim the light source.

20 Claims, 4 Drawing Sheets

HEADLAMP AIMING USING HIGH-DYNAMIC RANGE CAMERA

BACKGROUND

This disclosure relates to headlamp aiming systems in vehicular manufacturing processes.

Current headlamp aiming systems and methods, involving photometric aimers, utilize standard greyscale CCD (charge-coupled device) cameras, which gauge a beam pattern obtained from a headlamp. One part of an ideal analysis of a beam pattern obtained from the headlamp includes detailed identification of portions of the beam pattern to enable an accurate demarcation of a transition region. Here, the transition region may particularly be categorized as a cut-off or threshold that classifies one portion of the beam pattern as dark, while the other portion as the actual headlamp image. In particular, the transition region may form an outline of the headlamp image.

The usage of CCD cameras in conventional application of aiming a headlamp are found to cause inconsistencies in determining transition regions, such as the ones mentioned above, as certain portions and details of the obtained beam pattern are observed to be lost when the headlamp is brightly lit. Moreover, inadequate details resulting from improper contrast ratios and poor image shadows provided by the employed CCD cameras add to these inconsistencies. Currently, greyscale images obtained through the CCD cameras are converted to a saturated black/white image via adjustments in image exposure, causing the beam pattern to appear inaccurately, further leading to restrictions in determining precise transitions regions within the beam pattern. Software employed along with such a headlamp aiming processes perform such conversions, providing only approximate values of the threshold or the cut-off region in the beam pattern, thereby restricting a user's ability to accurately differentiate between a dark region and an actual headlamp image. More so, the values, being approximate, are obtained on a linear scale, the linear scale being generally dissimilar to a scale based on perceptions of the headlamp image by a human eye. Aiming headlamps through scales that are similar to the scales based on human perception of the headlamp image are according to the standards defined by the FMVSS (Federal Motor Vehicle Safety Standards) as well.

Need exists therefore to employ headlamp aiming systems that accurately define shadows and transition regions within a beam pattern, relating closely to the perceptions of the headlamp image to the human eye, and also to the standards set by the FMVSS.

SUMMARY

One embodiment of the present disclosure describes a method of aiming a light source. The method includes using an image-capturing device to capture a light beam pattern obtained from the light source, where the light beam pattern is configured to include a plurality of contrast ratios transitioning from a first intensity region to a second intensity region. In particular, the method provides for processing the contrast ratios of the light beam pattern to obtain corresponding values of the contrast ratios, transitioning from the first intensity region to the second intensity region, the corresponding values being logarithmic values, generating a related response curve. Lastly, the method includes using the logarithmic values and the response curve to aim the light source.

Another embodiment of the present disclosure describes a system for gauging a light beam pattern obtained through a light source. The light beam pattern includes a plurality of contrast ratios transitioning from a first intensity region to a second intensity region. An image-capturing device is disposed and is configured to capture the light beam pattern from the light source, while capturing the contrast ratios of the light beam pattern as well. Further, a processor is adapted to process the captured contrast ratios to obtain corresponding values of the transition of the light beam pattern from the first intensity region to the second intensity region. Here, the corresponding values are logarithmic values, which enable the generation of a related response curve. Additionally, a feedback interface coupled with the image-capturing device is configured to provide the logarithmic values and the related response curve, allowing an analysis of a transition region of the light beam pattern to be carried out.

Certain embodiments of the present disclosure describe a method of aiming a vehicular headlamp. The method includes using a high-dynamic range camera to capture a light beam pattern obtained from the vehicular headlamp, where the light beam pattern is configured to include a plurality of contrast ratios transitioning from a first intensity region to a second intensity region. In particular, the second intensity region is a lower intensity region than the first intensity region. The method further includes processing the contrast ratios of the light beam pattern to obtain corresponding values of the transition from the first intensity region to the second intensity region, and generating a corresponding response curve. Finally, the method includes using the corresponding response curve and the values obtained from the high-dynamic range camera to aim the headlamp. Here, aiming the headlamp includes analyzing and obtaining a transition region of the light beam pattern, the transition region being a luminous intensity threshold.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes systems and methods that generate logarithmic values corresponding to a headlamp beam pattern to accurately determine a transition region, establishing a cut-off or a threshold within the beam pattern. To this end, a high-dynamic range camera is employed to generate images of the beam pattern with high contrast ratios. Thereafter, the contrast ratios are processed to provide corresponding logarithmic values of the beam pattern, and to generate a related response curve according to federally mandated requirements. The transition region, once determined, differentiates between a low intensity region and a high intensity region within the beam pattern, eventually enabling headlamp aiming.

Exemplary Embodiments

Headlamp aiming processes in conventional vehicular manufacturing and assembly practices form a part of federally mandated transportation requirements, enabling vehicles to appropriately position headlamp beams over a driving course. Exemplarily, such federally mandated transportation requirements provide regulations to drivers and motorists to apply high-beam when their driving courses are poorly lit, while prescribing them to switch to a low-beam when other vehicles approach along an opposite driving course. Such switching is intended to restrict a headlamp glare over onward vehicles, keeping their drivers from being temporarily blinded by the glare, in turn preventing mishaps.

If calibrated and aimed improperly, headlamps running on a low-beam can blind onward drivers too, and care needs to be taken while aiming a headlamp. A sound calibration of a headlamp includes the establishment of accurate demarcation of transition regions and a threshold within a beam pattern. Current headlamp aiming processes, utilizing CCD cameras, are observed to capture light beam patterns with inadequate contrast ratios and details, however, intending to demarcate a transition region in the obtained pattern.

Figure 1:
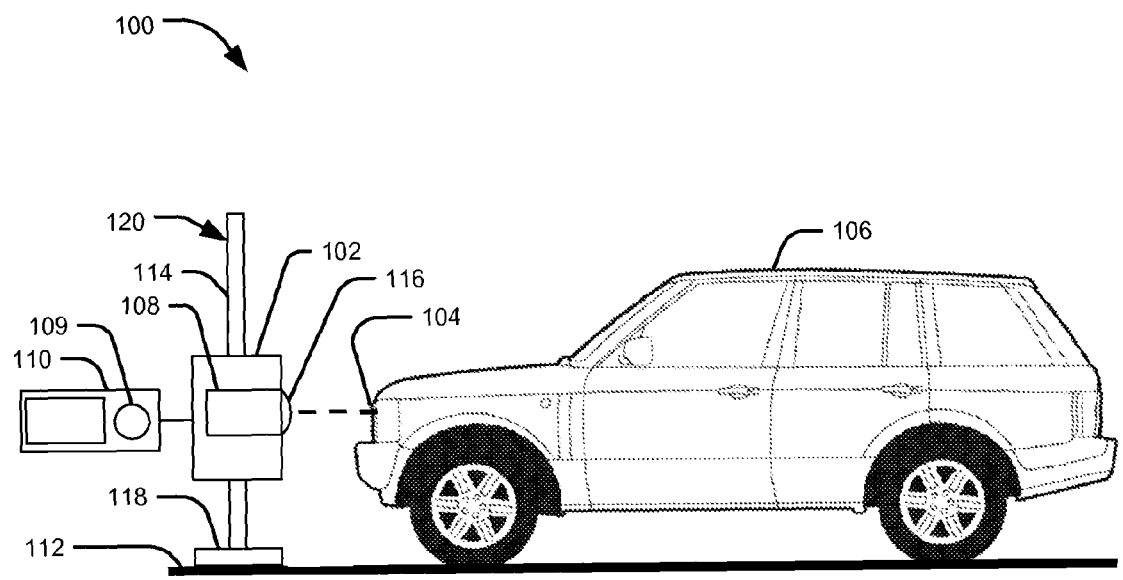
FIG. 1 illustrates an exemplary headlamp aiming system according to the present disclosure.

According to the present disclosure therefore, FIG. 1 depicts a system 100 for gauging or measuring a light beam pattern emitting from a light source as part of a headlamp aiming process in a vehicle 106 deployed over a floor 112. The light source is a vehicular headlamp 104. The aiming process being performed on the vehicle 106 during its manufacturing includes an image-capturing device, such as a high-dynamic range (HDR) camera 108, housed within a photometric aimer box 102, as shown. Further, a feedback interface 110 is coupled or disposed in cabled connection to the HDR camera 108.

The photometric aimer box 102 forms a part of a larger aimer assembly 120 that includes a mast section 114, which supports and includes counter-weight mechanisms (not shown) for the aimer box 102. A lens 116 configured to receive a headlamp beam is disposed on one side of the aimer box 102, facing the headlamp 104. Lying inline to the beam of the headlamp 104, and connected to the lens 116 on one end, is the HDR camera 108, disposed within the aimer box 102. Further, forming the base of the aimer assembly 120 is the stand 118, comprising base wheels, slope adjustment mechanism, etc., which are not depicted in the figure.

In detail, the aimer box 102 forms an enclosure for the camera 108 and is configured to have internal confines adapted to house the HDR camera 108, minimizing play and camera disengagement, from positioning measures configured within, during aimer alignments and headlamp aiming operations. Materials like high-grade plastic, metal, etc., could be used to manufacture the aimer box 102. Moreover, being supported around the mast section 114, the aimer box 102 can include measures (not shown) to slide, pan, and tilt the aimer box 102, relative to the headlamp 104.

The lens 116, in particular, can be a Fresnel lens composed of a number of small lenses arranged to make a lightweight lens of large diameter and short focal length suitable to be employed for headlamp aiming processes. The lens 116 being well known in the art will not be discussed further.

Feedback interface 110 can be a visual display and can be a workstation, computer, laptop, etc., and is used to obtain a visual feedback during the alignment and aiming process. A processor 109 included in the feedback interface 110 is configured to process the contrast ratios of the headlamp's image obtained through the HDR camera 108. In particular, the feedback obtained can include logarithmic values and the response curves associated with the system 100. Apart from the visual feedback, such devices, when employed, can include additional measures to provide audible feedback, such as an audible response, enabled through conveniently positioned speakers as well. A combination of a visual and an audible response can be configured too. Further, certain softwares or algorithms can be employed with the system 100 or the feedback interface 110 to work alongside the processor 109, to provide such feedback. Monitors, such as touchscreens, can form a part of the feedback interface 110 as well.

The HDR camera 108 is configured to capture images and patterns of the light beam emitting from the headlamp 104, enabling operators and/or users (not shown) of the system 100 to analyze and obtain appropriate threshold values and transitions regions in the associated headlamp beam patterns. In particular, the HDR camera 108 enables capturing the contrast ratios of the light beam pattern. The forthcoming description for FIG. 2A, 2B, 3A and 3B, depict and describe differences between the HDR camera 108 and a CCD camera.

Figure 2A:
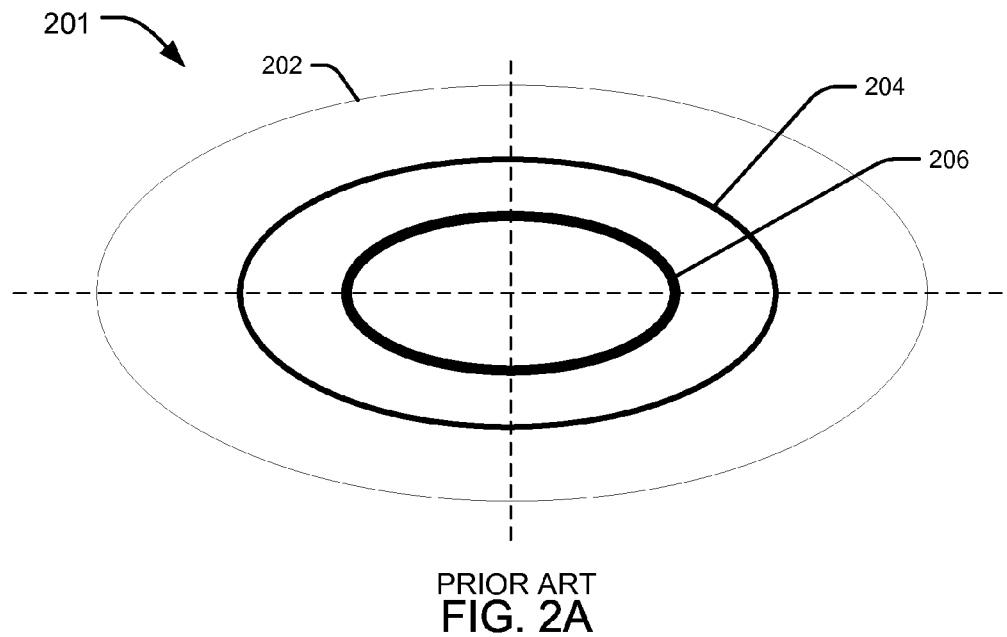
FIG. 2A schematically represents an exemplary beam pattern obtained through a CCD camera.

Accordingly, FIG. 2A depicts an exemplary CCD beam pattern 201 obtained when a CCD camera is used to analyze a beam, in place of the HDR camera 108. The obtained image, having imprecise details of the beam pattern 201, causes the image of the pattern 201 to appear indistinct and shapeless, like a white blob, depicting inaccurate peripherals and image details of an actual headlamp beam pattern.

Such aiming processes, utilizing a CCD camera, includes the conversion of a greyscale image of the beam pattern 201, obtained through the CCD camera, to a black/white image, by adjusting exposure and threshold through a related software. In particular, aiming the headlamp 104 includes attaching values to regions in the obtained beam pattern 201, and is exemplarily assisted through a scale of 0 to 255 provided in current practices through the software. Here, the region 0 may be the darkest or the black region, while the region 255 may be the brightest or the white region, constituting the outermost and the innermost portions of the beam pattern 201, respectively. Once related readings are adjusted, the region attached with a value of 200 may be demarcated as a transition region, threshold, or a beam cut-off region, establishing regions with values above 200 to be bright or white regions, while regions below 200 to be dark or no light regions. In particular, the regions above 200 generally are determined as the actual headlamp image.

Correspondingly, beam pattern 201, configured to include a plurality of contrast ratios, transitioning from a first intensity region 206 to a second intensity region 202, enables the first intensity region 206 to appear as the brightest portion in the image, which primarily forms the white blob portion, while the second intensity region 202 remains the least lit portion. It is understood therefore that the second intensity region 202 is configured to be a lower intensity region than the first intensity region 206. As noted above, related readings are provided through appropriate software or algorithms to attach values of contrast ratios exemplarily descending from 255 for the first intensity region 206, to 0 for the second intensity region 202. All regions transitioning from the first intensity region 206 to the second intensity region 202, lying in between the regions 206 and 202, are configured to have related values between 0 and 255 attached to them as well. An actual image of the headlamp is obtained after adjustments are rendered to associated readings and exposure limits to attain a cut-off, threshold, or a transition region 204 as shown in FIG. 2A, which has a value of 200 attached to itself, which in turn becomes the region defining the periphery of the actual headlamp image.

Here, adjusting an exposure time or an aperture of the camera lens may avoid looming of the image, and may prevent the image from losing the beam's characteristics, causing it to develop improved image characteristics, rather than becoming a white blob. Such an adjustment however may also lead to the loss of details present in the other shadow portions of the beam pattern due to an under exposure caused because of the adjustment. It is thus understood that usage of a CCD camera may not allow an accurate exposure of all portions of the headlamp beam pattern in a single image. This is particularly observed because most of the employed CCD and CMOS sensors have linear characteristics, as depicted in FIG. 2B, which is unlike the way in which a human eye perceives a headlamp beam.

Figure 2B:
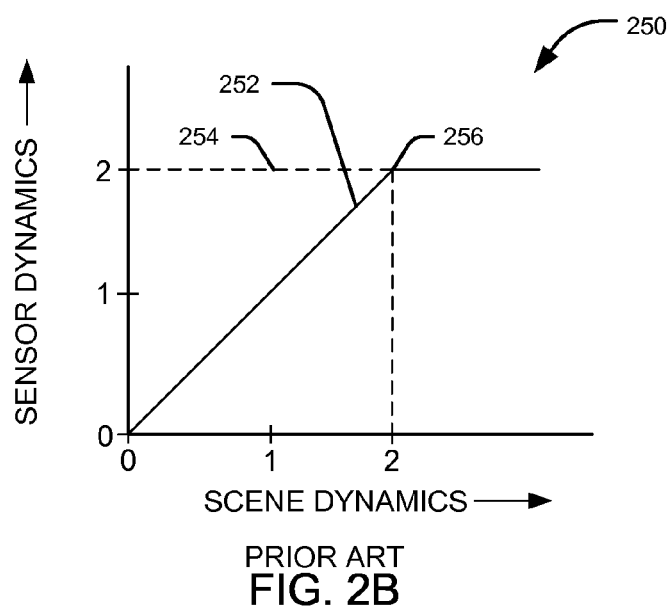
FIG. 2B is a graphical representation of an output of the headlamp aiming system obtained through the CCD camera.

FIG. 2B illustrates an output of the beam pattern obtained through a CCD camera, referred to as a CCD graph 250, depicting Sensor Dynamics on the Y-axis and Scene Dynamics on the X-axis. The sensor employed within the CCD camera generates electric charge in direct proportion to the amount of an incident light falling on the camera lens. Accordingly, if brightness of the headlamp doubles, the sensor value doubles as well. Even though certain imagery applications require a linear graphical relationship such as the one shown, related shortcomings however include the pixel saturation of the employed sensor to limit the dynamic range of an obtained image after a certain threshold, thus causing certain bright portions of the image to be captured incorrectly. The region above the line 254 depicts the saturation region as the line 252, depicting a linear relationship between the factors of sensor dynamics and the scene dynamics reaches a break-even point 256, implying the image to have saturated beyond it.

Figure 3A:
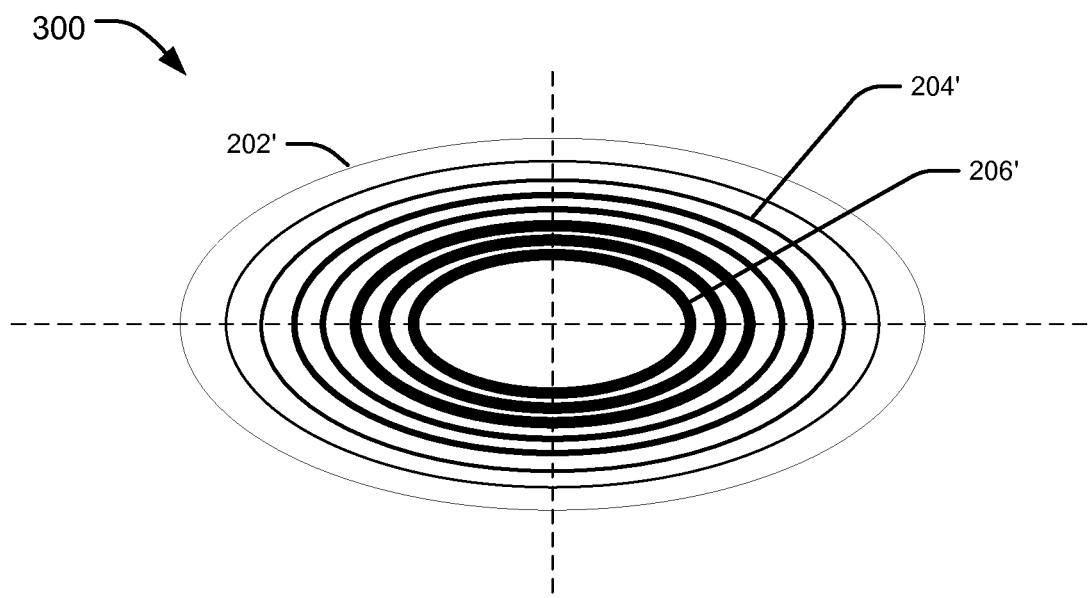
FIG. 3A schematically represents an exemplary beam pattern obtained through a HDR (High-dynamic Range) camera.

In contrast, the system 100, when equipped with the HDR camera 108, provides an HDR beam pattern 300, as shown in FIG. 3A. Similar to the beam pattern 201, the beam pattern 300 is configured to include a plurality of contrast ratios transitioning from a first intensity region 206' to a second intensity region 202', with the region 202' being of a lower light intensity than the region 206'. Here, it is understood that the transition from the region 206' to region 202' is more accurate than the ones observed for the beam pattern 201, because of improved contours and dynamic range of the actual beam pattern 300 obtained through the HDR camera 108. The beam pattern 300 is established through image processors disposed within the HDR camera 108 that processes the incoming headlamp beam, converting the beam into a perceivable image, while retaining ideal beam characteristics. Further, the processor 109, disposed within the feedback interface 110 (Shown in FIG. 1), processes the contrast ratios of the beam pattern 300, while further enabling corresponding values related to the contrast ratios to be computed. As can be seen through the figure, an image of the headlamp 104 obtained through the HDR camera 108 includes more details and a visible dynamic range, even in the bright regions of the beam pattern 300. Peripherals of the first intensity region 206' and the second intensity region 202', such as shown, are improved and are observed to be better defined than the images obtained through the CCD camera. Changes in dimensions of the regions 202' and 206' in relation to the regions 202 and 206, respectively, are observed as well. In particular, a transition region 204', being different than the one observed while using the CCD camera, enables an accurate demarcation of a cut-off region establishing the actual headlamp image. This is because the HDR camera utilizes sensors with nonlinear characteristics, returning values of white/grey/black values of the beam pattern 300 based on a logarithmic scale, such as logarithmic response curves, while achieving a detailed beam image.

Figure 3B:
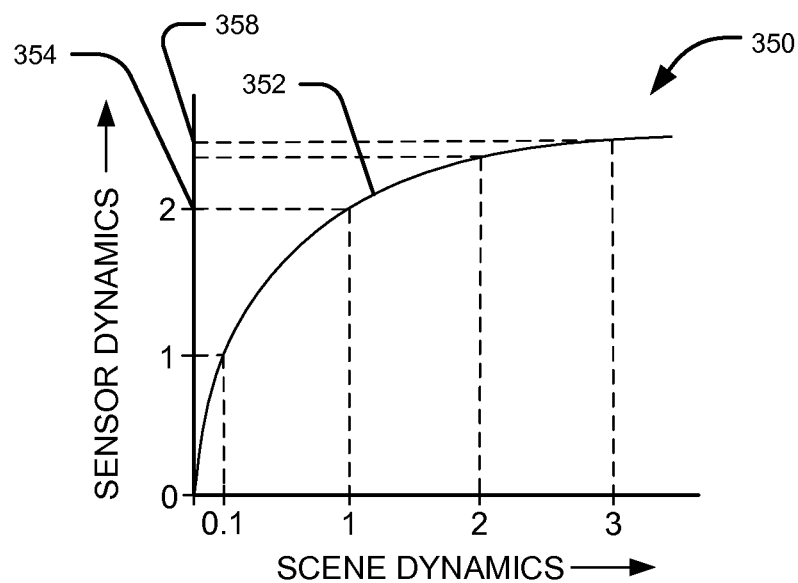
FIG. 3B is a graphical representation of an output of the headlamp aiming system obtained through a HDR camera.

Similar to the CCD graph 250, FIG. 3B depicts an output or a response curve, referred to as an HDR graph 350, depicting an HDR sensor's response in the form of a logarithmic curve 352 having nonlinear characteristics. Here, the HDR sensor is employed in the HDR camera 108. Dynamic compressions in images are consequently produced improving image quality and enabling a considerable capture of image details. Regions in the graph upto the point 354 are generally used by the dark part of the beam pattern 300, while the region beyond 354 upto the point 358 are generally utilized by the brighter portions of the beam pattern 300, avoiding over exposure even in bright regions. More particularly, the curve 352, and the values associated with the contrast ratios, such as from 0 to 255, of the regions transitioning from the region 206' to 202', can be obtained through the HDR camera 108. Alternatively, softwares or algorithms, such as the one currently in use with applications having aiming processes utilizing a CCD camera, can be employed to accomplish a similar operation.

It is therefore apparent that an employment of an HDR camera, such as the HDR camera 108, enables better beam analysis as the obtained images render closer perception of the headlamp beam according to a human eye.

In conventional shop floor practices, aiming the headlamp 104 of the vehicle 106, deployed over the floor 112, requires bringing the aimer box 102 upto the height of the headlamp 104, and placing the aimer box 102 in front of the headlamp 104, such that the lens 116 falls in line with the headlamp beam. Particularly, the aiming process includes aligning the photometric aimer box 102 accurately along the length of the vehicle 106 in relation to the slope of the floor 112. Such alignments may be performed manually by tilting or sliding the photometric aimer box 102 vertically and/or horizontally through known mechanisms, establishing an accurate alignment position of the aimer box 102 in relation to the headlamp 104. Subsequent images of the headlamp 104 obtained on the feedback interface 110 provide feedback to an operator assisting him in positioning the headlamp 104 accurately. Such procedures and the related equipment involved in the alignment process, being well known in the art, will not be discussed further.

Figure 4:
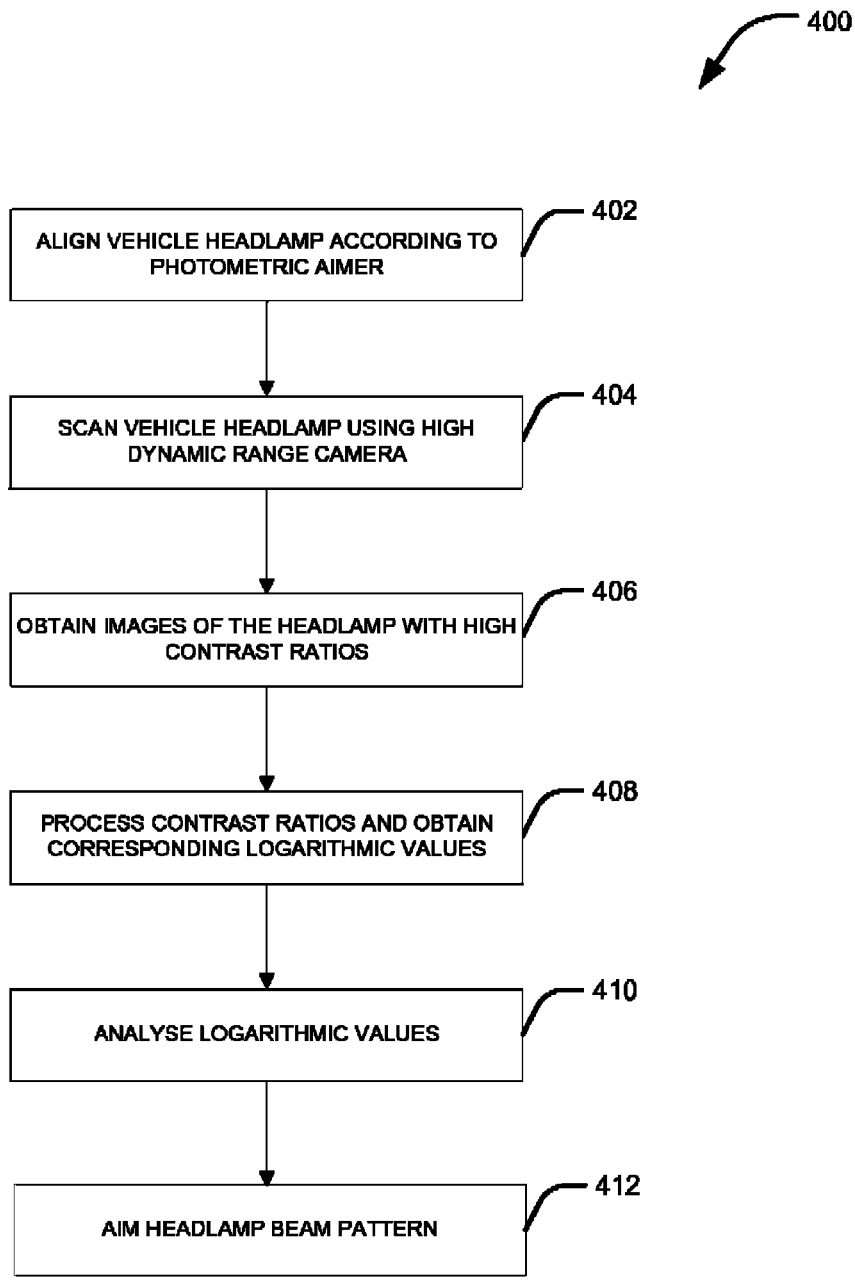
FIG. 4 is a flowchart depicting an exemplary methodology of the headlamp aiming system.

The system 100 set out above, aiming to provide an improved analysis of the headlamp beam pattern 300 to an operator or a user, is described through a methodology depicted via a flowchart 400 illustrated in FIG. 4. The methodology is discussed below.

Accordingly, at stage 402, an operator involved in the aiming process aligns the headlamp 104 of the vehicle 106 to the aimer box 102, once the headlamps are activated or switched on. Such aligning may be performed by tilting and/or panning the aimer box 102 horizontally or vertically through known measures incorporated within the aimer assembly 120. Once the alignment is accomplished, the lens 116, coupled to the camera 108 and disposed in front of the headlamp 104, as shown in FIG. 1, scans the vehicle headlamp 104 using the HDR camera 108. This happens at stage 404. At stage 406, the HDR camera 108, connected to the feedback interface 110, subsequently provides an image of the headlamp beam or the beam pattern 300. The image obtained here includes high contrast ratios of the headlamp 104. Having obtained the image of the beam pattern 300 through the HDR camera 108, the processor 109, employed with the feedback interface 110, computes or processes the contrast ratios of the beam pattern 300, obtaining corresponding values of the contrast ratios transitioning from the first intensity region 206' to the second intensity region 202'. Particularly, the corresponding values form logarithmic values. Along with obtaining the logarithmic values thus, the processor 109 computes the related response curve too. All such processing occurs at stage 408. More particularly, software or algorithm, installed within the feedback interface 110, converts an obtained headlamp image according to the units of candela, enabling computation of a gradient, via the processor 109. Subsequently, at stage 410, the operator analyzes the logarithmic values and the response curve, and finally aims the headlamp 104 through the obtained beam pattern 300. Such aiming is carried out as part of stage 412, and, in addition, the stage 412 includes providing the logarithmic values and the response curves on the feedback interface 110. Here, aiming the headlamp 104 is understood to be an analysis of the beam pattern 300, and more particularly, to obtain a threshold region within the beam pattern 300, aiding in headlamp positioning. This threshold region is the transition region 204', and such threshold regions can be referred to as a luminous intensity threshold of the beam pattern 300 as well.

Alternatively, beam pattern 300 or the headlamp image can be obtained through screens positioned within the HDR camera 108 itself, where no workstations are required. In addition, along with the provision of the feedback interface 110, provisions to store the image for later retrievals and analysis may be provided as well. In further embodiments, provisions could be set in place for the image to be accessed via a network based server system that enables multiple operators and/or users to access procedures of the aiming process, enabling the headlamp beam pattern to be analyzed from multiple standpoints.

Certain embodiments can include the processor 109 to be disposed exterior to the feedback interface 110 as an external processing unit, while other embodiments may include the HDR camera 108, processor 109, and the feedback interface 110, all integrated into an unitary unit. The configurations and arrangements of the system 100, depicted in FIG. 1, are thus not limited in any way.

Advantageously, using a HDR camera, such as the HDR camera 108, minimizes the occurrence of errors observed in conventional headlamp aiming processes, reducing defects and enhancing customer satisfaction, while allowing the assembly processes to be considerably more precise in measuring a beam pattern. Additionally, incorporation of HDR cameras may also reduce the need for the assembly plants to carry out constant auditing and inspection processes. Furthermore, aiming vehicular headlamps through HDR cameras can provide for safer automotive driving operations as well.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. A method of aiming a light source, the method comprising:

using an image-capturing device to capture a light beam pattern obtained from the light source, the light beam pattern configured to include a plurality of contrast ratios transitioning from a first intensity region to a second intensity region;

processing the contrast ratios of the light beam pattern to obtain corresponding values of the contrast ratios transitioning from the first intensity region to the second intensity region, the corresponding values being logarithmic values generating a related response curve; and using the logarithmic values and the related response curve to aim the light source.

2. The method of claim 1, wherein aiming the light source includes an analysis of the beam pattern, obtaining a transition region of the light beam pattern.

3. The method of claim 2, wherein the transition region is a luminous intensity threshold.

4. The method of claim 1, wherein using the logarithmic values and the related response curve includes providing the logarithmic values and the related response curve on a feedback interface.

5. The method of claim 4, wherein processing the contrast ratios of the light beam pattern is enabled through a processor configured within the feedback interface.

6. The method of claim 4, wherein the feedback interface includes one of the following:
 a visual display;
 an audible response; and
 a combination of the visual display and the audible response.

7. The method of claim 1, wherein the image-capturing device is a high-dynamic range camera.

8. The method of claim 1, wherein the light source is a vehicular headlamp.

9. The method of claim 1, wherein the second intensity region is a lower intensity region than the first intensity region.

10. A system for gauging a light beam pattern, the system comprising:

a light source configured to emit the light beam pattern, the light beam pattern including a plurality of contrast ratios transitioning from a first intensity region to a second intensity region;

an image-capturing device configured to capture the light beam pattern obtained from the light source, while capturing the contrast ratios of the light beam pattern;

a processor adapted to process the contrast ratios to obtain corresponding values of the contrast ratios transitioning from the first intensity region to the second intensity region, the corresponding values being logarithmic values generating a related response curve; and a feedback interface coupled with the image-capturing device, the feedback interface configured to provide the logarithmic values and the related response curve, enabling an analysis of a transition region of the light beam pattern.

11. The system of claim 10, wherein the feedback interface includes one of the following:
 a visual display;
 a audible response; and
 a combination of the visual display and the audible response.

12. The system of claim 10, wherein the processor is disposed within the feedback interface.

13. The system of claim 10, wherein the image-capturing device is a high-dynamic range camera.

14. The system of claim 10, wherein the light source is a vehicular headlamp.

15. The system of claim 10, wherein the transition region of the light beam pattern is a luminous intensity threshold.

16. The system of claim 10, wherein the second intensity region is a lower intensity region than the first intensity region.

17. A method of aiming a vehicular headlamp, the method comprising:
   using a high-dynamic range camera to capture a light beam pattern obtained from the vehicular headlamp, the light beam pattern configured to include a plurality of contrast ratios transitioning from a first intensity region to a second intensity region, the second intensity region being a lower intensity region than the first intensity region;
   processing the contrast ratios of the light beam pattern to obtain corresponding values of the contrast ratios transitioning from the first intensity region to the second intensity region, and generating a related response curve, and
   using the related response curve and the corresponding values obtained from the high-dynamic range camera to aim the vehicular headlamp, the aiming to include analysis and obtaining a transition region of the light beam pattern, the transition region being a luminous intensity threshold.

18. The method of claim 17, wherein processing the contrast ratios is enabled through a processor configured within a feedback interface, and using the related response curve and the corresponding values includes providing the related response curve and the corresponding values on the feedback interface.

19. The method of claim 18, wherein the feedback interface includes one of the following:
   a visual display;
   a audible response; and
   a combination of the visual display and the audible response.

20. The method of claim 17, wherein the corresponding values are logarithmic values.

* * * * *